(12) United States Patent
Spizig et al.

(10) Patent No.: US 11,385,180 B2
(45) Date of Patent: Jul. 12, 2022

(54) METHOD AND DEVICE FOR IMAGING A SPECIMEN SURFACE

(71) Applicant: WITEC WISSENSCHAFTLICHE INSTRUMENTE UND TECHNOLOGIE GMBH, Ulm (DE)

(72) Inventors: Peter Spizig, Ulm (DE); Olaf Hollricher, Neu-Ulm (DE); Wolfram Ibach, Ulm-Lehr (DE)

(73) Assignee: Witec Wissenschaftliche Instrumente und Technologie GmbH, Ulm (DE)

( * ) Notice: Subject to any disclaimer, the term of this patent is extended or adjusted under 35 U.S.C. 154(b) by 0 days.

(21) Appl. No.: 16/953,537

(22) Filed: Nov. 20, 2020

(65) Prior Publication Data

US 2021/0148823 A1  May 20, 2021

Related U.S. Application Data

(63) Continuation-in-part of application No. 16/490,753, filed on Sep. 3, 2019, now Pat. No. 10,876,895, which
(Continued)

(30) Foreign Application Priority Data

Mar. 3, 2017 (DE) .................... 10 2017 203 492.0

(51) Int. Cl.
*G01J 3/44* (2006.01)
*G01N 21/64* (2006.01)
(Continued)

(52) U.S. Cl.
CPC ......... *G01N 21/6458* (2013.01); *G01N 21/65* (2013.01); *G02B 21/06* (2013.01);
(Continued)

(58) Field of Classification Search
CPC .... G01N 21/6458; G01N 21/64; G01N 21/65; G02B 21/16; G02B 21/241; G02B 21/26;
(Continued)

(56) References Cited

U.S. PATENT DOCUMENTS 7,002,737 B1   2/2006  Takashi et al.
7,978,346 B1   7/2011  Nabeel
(Continued)

FOREIGN PATENT DOCUMENTS

| DE | 102007038579 | 2/2009 |
| WO | WO2010135323 | 11/2010 |
| WO | WO2011131311 | 10/2011 |

OTHER PUBLICATIONS

PCT International Search Report (PCT/EP/2018/054401); dated Apr. 24, 2019.
(Continued)

*Primary Examiner* — Abdullahi Nur
(74) *Attorney, Agent, or Firm* — Pitts & Lake, P.C.

(57) ABSTRACT

A method and a device are provided which enables a simple and fast Raman and/or fluorescence measurement even on uneven specimen surfaces; additionally, the invention should make it possible to confocally image a plane or a surface, in particular a surface of a specimen, i.e. with the aid of confocal microscopy.

21 Claims, 9 Drawing Sheets

Related U.S. Application Data is a continuation of application No. PCT/EP2018/054401, filed on Feb. 22, 2018.

(60) Provisional application No. 62/466,691, filed on Mar. 3, 2017.

(51) Int. Cl.
  *G02B 21/16* (2006.01)
  *G01N 21/65* (2006.01)
  *G02B 21/24* (2006.01)
  *G02B 21/26* (2006.01)
  *G02B 21/06* (2006.01)

(52) U.S. Cl.
  CPC ........... *G02B 21/16* (2013.01); *G02B 21/241* (2013.01); *G02B 21/26* (2013.01)

(58) Field of Classification Search
  CPC .... G02B 21/06; G02B 21/245; G02B 21/006; G02B 21/0076; G01J 3/00; G01J 3/02; G01J 3/28; G01J 3/26
  See application file for complete search history.

(56) References Cited

U.S. PATENT DOCUMENTS

2008/0297911 A1  12/2008  Christenson et al.
2017/0023482 A1*  1/2017  Cicerone .............. G02B 21/365

OTHER PUBLICATIONS

Notification of Transmittal of Translation of the International Preliminary Report on Patentability (PCT/EP2018/054401); The International Bureau of WIPO: Patent Cooperation Treaty, PCT/IB/338.

* cited by examiner

METHOD AND DEVICE FOR IMAGING A SPECIMEN SURFACE

CROSS-REFERENCE TO RELATED APPLICATIONS

This is a continuation-in-part application of U.S. application Ser. No. 16/490,753 filed Sep. 3, 2019, which is a U.S. national phase application under 35 U.S.C 371 of International Patent Application No. PCT/EP2018/054401 filed Feb. 22, 2018, and claims the benefit of U.S. Provisional Application No. 62/466,691 filed Mar. 3, 2017 and DE Application No. 10 2017 203 492.0 filed Mar. 3, 2017, the disclosures of which are hereby incorporated by reference herein in their entirety.

BACKGROUND OF THE INVENTION

The invention relates to a method and a device for imaging a surface, in particular the surface of a specimen with a topography by scanning a large number of areas of the surface using confocal microscopy. In confocal microscopy, a confocal image of the area of the surface is produced by a detector located in an image plane. In particular, the invention relates to so-called confocal Raman and/or fluorescence microscopes or devices for confocal fluorescence and/or Raman microscopy, but is not limited to them.

In addition to the method for imaging a surface, in particular the surface of a specimen with topography, a device for imaging the specimen using confocal microscopy or confocal Raman and/or fluorescence microscopy is also described. Raman measurements or fluorescence measurements can be used to excite a specimen with a light source and to image chemically different materials of the specimen based on the light emitted by the specimen.

In confocal microscopy, the light from a light source is guided through an objective on its way to the specimen and thus focused on an essentially point-shaped area (airy disk) of the specimen surface. At the same time, the objective can be used to pick up the light emitted by the specimen, in particular the Raman or fluorescent light emitted, and to transmit it to a detector. With the aid of the objective, it is thus possible to confocally image an area or an essentially point-shaped area of the specimen essentially perpendicular to the direction of the illumination and/or detection beam path. If the specimen or objective or illumination is moved, it is possible to perform a scan in the x-y-direction and thus scan the entire specimen.

In confocal imaging, a light source, preferably an essentially point-shaped light source, preferably a laser light source, is imaged on a focus (Abbe condition) resulting from the wave nature of the light or an essentially point-shaped area, ideally on a point of the specimen. This pixel is then focused preferably with the same optics, i.e. with the same objective lens, onto a pinhole in front of a detector. Instead of placing a separate pinhole in front of the detector, it is also possible for the detector itself to represent the pinhole. If confocal imaging is used for microscopy, a considerable increase in image contrast is achieved, since only light from the focal plane of the objective contributes to the imaging.

Concerning confocal light microscopy, reference is made to DE 199 02 234 A1, in which a microscope with a confocal objective is described in detail.

Confocal measurement has advantages in many applications, e.g. Raman and/or fluorescence measurements, since an existing scattered light background is suppressed very strongly. Since only light from the focal plane is measured, confocal microscopy also makes it possible, in the case of transparent specimens, to measure specimen areas below the actual specimen surface.

A confocal Raman and/or fluorescence microscope has become known from the post-published DE 10 2009 015 945 A1.

A problem with confocal measurements or confocal microscopy, however, is that due to drift, topography, specimen unevenness, roughness, but also tilting of the specimen, the plane or area to be imaged, in particular the surface, often does not remain in the focal plane when the specimen is scanned.

For satisfactory results, many applications therefore require extended methods and devices for focus stabilization or focus tracking with the surface to be measured.

An AFM microscope or STM microscope has become known from U.S. Pat. No. 5,581,082 B1, which is combined with a confocal microscope. Using the AFM or STM tip, the specimen can also be scanned in the z-direction in particular.

With U.S. Pat. No. 5,581,082 B1, depth information is obtained with the help of the AFM tip. During AFM measurement, in particular AFM topography measurement, optical signals are also recorded so that the topography data obtained from AFM topography measurement can be correlated with the optical data. With U.S. Pat. No. 5,581,082, the confocal measurement is always carried out simultaneously with the topography measurement. A disadvantage of U.S. Pat. No. 5,581,082 is the limited scanning range, which lies in the range from 100 µm to a maximum of 300 µm in the x-y plane. Furthermore, the AFM tip in the z-direction can only provide depth information in the range of 5-10 µm maximum. U.S. Pat. No. 5,581,082 B1 therefore does not allow measurements of specimen areas >300 µm and roughness >10 µm.

In confocal microscopy, especially in confocal Raman microscopy and/or fluorescence microscopy on surfaces, especially on larger specimen areas, especially >300 µm and on technical surfaces, the problem arises that an image is very difficult to obtain because often there is not enough flat specimen topography. During a scan in a given plane, a so-called X-Y scan, the specimen surface leaves the focal plane of the microscope repeatedly, so that a simple and complete image of the specimen surface or specimen is not possible.

WO 2011/131311 A1 describes a method and a device which makes it possible to first determine a surface topography of a specimen for confocal microscopy and then to transfer the surface to be imaged to a confocal plane with the aid of the surface topography values. WO 2011/131311 A1 proposes a device with a surface topography sensor for this purpose. The surface topography sensor can be a confocal sensor with an optical system, preferably with reflective and/or diffractive components. Alternatively, WO 2011/131311 A1 specifies tactile sensors such as a profilometer, AFM, a white light interferometer, a triangulation sensor or a laser scanning system. A disadvantage of the WO 2011/131311 A1 system is that first the surface topography of the entire specimen is determined and then the actual fluorescence or Raman measurement, taking into account the determined surface topography, is carried out. This leads to a relatively large time lag between topography and fluorescence or Raman measurement. A device or specimen drift or time-varying specimens (e.g. due to evaporation or drying of the specimen) can lead to great difficulties with this method.

As an alternative to the sequential measurement described above, i.e. Raman or fluorescence measurement after topography determination, WO 2011/131 311 A1 also describes a single pass method. In this case, a distance measurement is first carried out at each raster point with the aid of a surface topography sensor, in particular a chromatic sensor, from which a distance signal characteristic of the surface topography is determined, and this distance signal is then used directly for this one raster point in order to track the focal plane or confocal plane of the confocal microscope, in particular confocal Raman microscope, before the cycle is repeated at the next raster point. This means that the topography is first measured at each raster point and that confocal measurement, in particular confocal Raman or fluorescence measurement, is only started after completion of this measurement and after completion of the tracking with the topography. No confocal Raman or fluorescence signal is detected for large time ranges of the cycle, especially during the entire topography measurement and the displacement of the specimen from one raster point to the next.

In summary, this single pass method described in WO 2011/131 311A1 is also characterized by the complex back and forth switching of the various measurement modes and measurement cycles. This is associated with a large time interval during which no confocal signals, in particular Raman or fluorescence signals, can be detected. In addition, the method is very slow and complex.

Another disadvantage of the methods listed in WO 2011/131 311A1 is that, for example, the confocal chromatic sensor used, due to its measuring principle, requires a white light source that is as broadband as possible and at the same time very intensive, in order to achieve sufficient topography resolution with short measurement times. In contrast to the monochromatic light sources typically used for Raman or fluorescence measurements such as lasers, intensive broadband light sources are usually not point light sources but have a clearly macroscopic extension. However, only light from a point light source can be projected onto a minimally small diffraction-limited focus. This limits the achievable lateral resolution of the topography measurement with a confocal chromatic sensor to about 10 µm in contrast to diffraction-limited Raman or fluorescence measurement in practice. This clear difference in the lateral resolution of the topography measurement to the lateral resolution of the diffraction-limited Raman and/or fluorescence measurement by about one order of magnitude, especially in the case of high-resolution measurements on fine structures or rough, porous surfaces, leads to the fact that the focal plane for the Raman or fluorescence measurement cannot be correctly tracked with laterally small specimen topographies.

It is further disadvantageous, in particular if the Raman or fluorescence measurement as well as the topography measurement is to be carried out by the same lens, as suggested in WO 2011/131 311A1, that both the Raman and fluorescence measurement, as well as the confocal chromatic topography measurement, occupy the broadest possible spectral frequency ranges, ideally practically the entire visible spectral range. It is therefore difficult to avoid spectral overlapping. If the wavelength ranges for topography measurement and Raman and fluorescence measurement are to be separated into two non-overlapping spectral ranges, as described in WO 2011/131 311 A1, this places extremely high demands on the coating of the common optics, since the lenses should be optimized for the entire resulting summed spectral range.

WO 2011/131 311 A1 therefore also introduces a further, simpler single pass method, which is referred to as the extended focus method. In addition to the first excitation light source, no other light source is required for surface detection. Instead, the specimen is modulated in the z-direction and the signal characteristics of the reflected Raleigh light are recorded. If the specimen is in focus, maximum Raleigh light is detected. The signal characteristic of the Raleigh light during modulation is then used to track the mean z-position of the specimen around which modulation takes place with the specimen topography. At least the middle z-position thus remains in focus. The Raman or fluorescence measurement is performed during the entire modulation period.

This means that the specimen may be outside the actual focus for the Raman or fluorescence signal for a relatively long time, so that no or only undesired Raman or fluorescence signal is detected for a long time, resulting in the Raman or fluorescence signal being weak and blurred. At the same time, the modulation destroys the confocallity of the measurement, since areas above and below the specimen surface of interest also contribute to the measured Raman or fluorescence signal.

The proven advantages of confocal light microscopy, such as higher spatial resolution and high depth of field, are thus lost in this method.

BRIEF SUMMARY OF THE INVENTION

It is therefore the object of the invention to provide a method and a device by which the disadvantages of the prior art, in particular those as set out in WO 2011/131 311 A1, can be avoided. In particular, a method and a device shall be provided which enables a simple and fast Raman and/or fluorescence measurement even on uneven specimen surfaces. Furthermore, the invention should make it possible to confocally image a plane or a surface, in particular a surface of a specimen, i.e. with the aid of confocal microscopy. This requires that the specimen is always kept in focus during the entire measurement, even with insufficiently flat specimen topography, for example a curved specimen.

According to the invention, this object is solved in that a method for imaging a plane or surface, in particular a surface with a topography by means of confocal microscopy, in particular confocal Raman and/or fluorescence microscopy, wherein the device for carrying out the method emits a first light source for generating excitation radiation for Raman and/or fluorescence microscopy and a second simultaneously active light source for generating radiation in a narrow wavelength range which does not coincide with the wavelength range of the first light source or with the wavelength range to be detected, such as the Raman/fluorescence light. Simultaneously means in this application that the first and second light sources emit light onto the specimen simultaneously, i.e. together, and that the topography measurement of the specimen for focus tracking on the one hand and the Raman or fluorescence measurement on the other hand can thus work simultaneously. Furthermore, the focal plane of the second light source is brought into/onto the surface of the specimen by means of a separately controllable focal position and the topography of the specimen determined in this way is used from the control signal of the controllable focal position to control/regulate the focal plane of the first light source. With the method according to the invention, the Raman and/or fluorescence measurement always remains active and in focus and is not influenced by the simultaneously performed topography measurement of the specimen for focus tracking. The method is thus characterized in that Raman and/or fluorescence measurement and topography measurement are performed simultaneously. Both the first light source and the second light source can be a laser light source without limitation hereon. Super luminescent diodes (SLED) as light sources would also be possible. Like laser diodes, SLEDs are based on a p-n junction and are operated in the through direction. The emitted mean wavelength is based on the band gap and can be influenced by selecting different semiconductor materials such as indium arsenide (InAs), indium gallium arsenide (InGaAs) or indium phosphide (InP). In contrast to laser diodes, SLEDs do not have a resonator, which represents an optical feedback by means of mirrors. A SLED like a laser can be considered as a point light source. The light emitted by a SLED can be focused to the same small spot size as laser light. But a SLED light features a much smaller coherence length than laser light. Therefore using a SLED for the second light source is advantageous as optical interferences between the optical signal and unintentional and disturbing reflections which are generated on surfaces of lenses and other optical components which don't have a antireflective coating can be avoided.

In the method according to the invention, two lateral focuses of approximately the same size are used, i.e. the focus size of the first and second focus are approximately the same and can thus evaluate the identical specimen area. The first focus is the focus of the first light source, i.e. the laser light source for Raman or fluorescence excitation. The second focus is the focus of the second light source and serves to determine the topography. The focal plane of the second light source is brought onto the surface of the specimen by means of a separately controllable focal position. The separately controllable focal position can be adjusted, for example, by means of an electrically focusable lens. A periodic excitation of the lens is particularly preferred, which periodically changes its focal position in the z-direction. Whenever the focus of the second light source lies in the plane of the surface of the specimen, a signal is detected. This is due to the fact that as a result of the confocal principle, only when the focus of the second light source lies on the surface is light reflected back onto the detector with sufficient intensity so that a signal can be detected. The topography of the specimen determined from the control signal of the controllable focal position is used to transfer the specimen into the focal plane of confocal Raman and/or fluorescence microscopy. With this invention it is thus possible to keep the specimen permanently in the confocal plane of the Raman and/or fluorescence measurement by continuously evaluating the focal plane of the second light source. At the same time, the Raman and/or fluorescence measurement is not disturbed by the determination and regulation of the topography and can remain permanently active. This considerably amplifies the Raman and/or fluorescence signal compared to that achieved by a control system in accordance with WO 2011/131 311A1, which only represents a tracking system. With the method according to the invention, it is thus possible to compensate a technical and/or mechanical drift, so that longer measuring times are possible compared to the method known from WO 2011/131 311 A1 since thermal and/or mechanical drift is compensated. High-resolution measurements or measurements on porous or rough specimens are also greatly improved by the comparable lateral resolution of topography and Raman and/or fluorescence measurements.

Raman and/or fluorescence measurements of specimens drying during the measurement or liquids evaporating, for example, are also possible because the regulation according to the invention provides continuous tracking of the surface.

According to the invention, the specified regulation/control is used to hold the specimen in the focal plane for Raman and/or fluorescence measurement.

The imaging of the plane or surface, in particular the surface of the specimen, by confocal microscopy, in particular Raman and/or fluorescence microscopy, is achieved by scanning a plurality of regions of the plane or surface, in particular the surface, with a device for confocal imaging of the region of the plane or surface, in particular the surface.

What is meant by the topography of a surface or by a specimen topography in this application will be described as an example, but not conclusively, for a confocal Raman microscope. In such an arrangement, specimen topography means specimen unevenness greater than 1 nm, in particular greater than 10 nm, preferably greater than 100 nm. The specimen irregularities are deviations of the specimen surface in the z-direction, which are also referred to as roughness.

The plane to be scanned is the x/y plane. The resolution in the x/y plane of a Raman microscope or fluorescence microscope is at least 0.1 µm, preferably at least 1 µm, preferably 1 µm to 50 µm.

According to the invention, the position of the focal plane of the second light source is constantly determined. For this purpose, the focal position of the second light source is varied, for example, with the aid of an electrically focusable lens, wherein the lens is preferably excited periodically, for example at a frequency of 200 Hz to 800 Hz. In addition to the lens, whose focus is changed electrically, it is also possible to move the lens periodically mechanically. An alternative frequency range, which is specified from 200 Hz to 800 Hz, is a frequency range from 50 kHz to 1 MHz. When determining the position of the focal plane by varying the focal position of the second light source, it is necessary to adjust the modulation depth of the focus or the focal position of the roughness or topography of the specimen.

The specimen is transferred to the confocal plane of confocal Raman or fluorescence microscopy on the basis of the focal plane of the second light source determined with the aid of the second light source and, for example, the electrically focusable lens. The introduction into the confocal plane of Raman/fluorescence microscopy thus takes place simultaneously or at the same time as the measurement of the focal position of the second light source.

With the aid of the second light source, in particular the second laser light source, and by passing through the focus of the second light source with the aid of the electrically focusable lens, it is possible, for example, to keep the Raman microscope permanently in the focal plane or confocal plane for Raman microscopy and thus to operate confocal Raman microscopy even with pronounced, i.e. non-planar, specimen topography.

In a particularly preferred embodiment of the invention, it is provided that the re-adjustment of the focal plane of the first light source for Raman and/or fluorescence microscopy is carried out, for example, by changing the distance between the microscope objective and the specimen. This can be done by moving the specimen table and/or the microscope objective. Instead of changing the distance between the microscope and the sample it is also possible to use a further or second electrically controllable lens or an objective with a controllable focal distance to bring the focus of the microscope to the sample surface. This second controllable lens is situated before the suitable optical system which focus the light onto an essentially point shaped area on a specimen. By the further electrically controllable lens the focus can be changed to different heights in z-direction of the specimen. The further electrically controllable lens can move the focus of both light sources in z-direction and this has the same effect as changing the distance between the microscope objective and the sample by raising and lowering the sample table or the microscope objective. The advantage of such a setup is that it is not necessary to move heavy mechanical components such as the sample table or microscope. Since the sample table or the microscope objective has not to be moved, components such as z-scanners are unnecessary. In a further embodiment the further or second electrically controllable lens and the change of the distance between sample and objective lens can be combined. This is advantageous since the mechanical movement of the focus in z-direction in respect to the sample can be used for a course and rather slow focus control, while the fast electrically controlled second lens can be used for a fast finetuning of the z-position of the focus.

Another preferred embodiment of the invention is that the light from the first and second light sources is guided through the same microscope objective.

A particularly simple optical setup can be achieved if the focal position of the second light source is essentially controlled in such a way that the focus of the second light source is shifted along the optical axis of the microscope.

A simple determination of the topography of the specimen is possible if the focal position of the second light source is varied periodically and the topography of the specimen is determined by the temporal course of the maxima of the intensity of the reflected or scattered light of the second light source.

It is advantageous if the focal position of the second light source is controlled by means of a focusable lens in the beam path, which only influences the beam path of the second light source. An electrically focusable lens in which the focal length is determined by the application of an electrical voltage or by an electric current, is a particularly simple design that can be used to change the focal position.

Alternatively, it is possible to control the focal position of the second light source using a sliding lens or several lenses.

It is particularly preferred if the lateral focus size of the second light source essentially corresponds to the lateral focus size of the first light source. This has the advantage that the topography determination on the one hand and the Raman or fluorescence measurement on the other hand evaluate the same specimen range and the same specimen volume. If, on the other hand, the lateral focal size of the two light sources were to differ greatly, especially if the focal size of the first light source was significantly larger than the focal size of the second light source, all topography details smaller than the focal size of the first light source, such as pores or particles on the specimen, would escape topography determination due to their small size and the Raman or fluorescence measurement at these specimen locations would therefore not be kept in focus. Due to the essentially identical lateral focus sizes of the first and second light sources, ideal topography compensation is achieved, since exactly the same topography details are corrected or balanced, which are also resolved by the Raman or fluorescence measurement.

The necessary change in the distance between the microscope objective and the specimen determined by the control/regulation can be achieved by moving the specimen in the direction of the optical axis of the microscope. Alternatively, the microscope can be moved in the direction of the optical axis of the microscope or the microscope objective can be moved in the direction of the optical axis of the microscope. A further alternative to control/regulate the system to determine the topography of the sample instead of moving the stage or microscope e.g. by z-scanners is to use a further tunable lens or objective with a controllable focal distance.

In such a system the lens or objective has a controllable focal distance to bring the focus of the microscope to the sample surface. Also a combination of a z-scanner and a focusable lens is possible.

It is particularly preferred if the wavelength range of the second light source does not overlap with the wavelength range of the Raman scattering light and/or the fluorescent light to be detected.

In addition to the method, the invention also provides a device for imaging the surface of a specimen by scanning a plurality of regions of the surface in the x/y plane, comprising means for confocally imaging the region of the surface in a focal plane onto a detector, wherein the device has first and second light sources.

The light of the confocal Raman and/or fluorescence microscopes, i.e. the light of the first light source comes according to the invention to lie in a first wavelength range and the light of the second light source in a second wavelength range, wherein the first and second wavelength ranges do not overlap. The first wavelength range is usually selected such that the first wavelength range is defined by the limits of the emitted luminescence spectrum and/or Raman spectrum of the specimen to be investigated and the second wavelength is above or below the first wavelength range without overlapping with the first wavelength range. For example, the first wavelength range for the emitted luminescence or Raman spectrum of the specimen to be examined can range from 350 nm to 1000 nm, preferably 500 nm to 1000 nm, in particular 532 nm to 650 nm. The second wavelength ranges from 1000 nm to 2000 nm, preferably from 1000 nm to 1500 nm.

As described above, in confocal microscopy the light of the monochromatic first light source for Raman and/or fluorescence measurement is guided through an objective on the way to the specimen and thus focused essentially on one point of the specimen surface. In the case that the device is a confocal Raman microscope in particular, it can be provided that a spectrometer spectrally decomposes the light emitted by the specimen, i.e. the Raman or fluorescence light. Such a spectral decomposition can take place in the spectrometer for example with a grating or a prism. If the light thus decomposed is recorded with a CCD camera, it is possible to record a complete spectrum of the Raman or fluorescence light scattered by the specimen. The advantage of the spectral decomposition of the Raman light in a Raman microscope is that, for example, by rotating the grating in the spectrometer, any spectral range can be selected for the detector for measurement.

The device, in particular the confocal microscope, preferably the confocal Raman and/or confocal fluorescence microscope, can have a specimen table which can be moved in x/y direction and which enables, for example, the specimen surface to be imaged by scanning the specimen. Alternatively or additionally, the objective or the microscope itself can be moved to obtain an image of the specimen. It is also possible to record spatial maps of spectral properties of the specimen. A very high depth resolution is achieved in particular with confocal imaging. Alternatively the focal distance of the microscope can be altered, e.g. by using a tuneable optical lens.

With the help of the second light source and especially in combination with the electric focusable lens, the focal plane of the second light source can be brought, according to the invention, into/onto the surface of the specimen by means of a separately controllable focal position. From the control signal of the controllable focal position, the topography of the specimen is determined to control the focal plane of the first light source for Raman microscopy. This control/regulation allows the specimen surface to be kept constantly in the confocal plane for confocal Raman microscopy during scanning. For this purpose, the x-y scan of the specimen is extended to an x-y-z scan, wherein the z scan serves to compensate the specimen topography. For this purpose, the specimen table and/or the lens can be moved in the z-direction in addition to the x/y direction. Alternatively instead of moving the specimen or the microscope mechanically in z-direction the focal distance of the microscope can be altered, e.g. by a further tunable lens arranged within the optical system of the microscope.

In contrast to the WO 2011/131 311 A1, it is not necessary to first record the surface topography for control/regulation in the method in accordance with the invention, in order to then subsequently track the specimen plane into the focus. Instead, the continuous determination of the focal position with the aid of the second light source allows the specimen to be simultaneously brought into the focal plane of the objective for confocal Raman and/or fluorescence microscopy. This has the advantage that a much stronger Raman and/or fluorescence signal is obtained than with a mere tracking as in WO 2011/131311 A1.

BRIEF DESCRIPTION OF THE DRAWINGS

The invention will be described in detail below by reference to the embodiment examples, wherein.

DETAILED DESCRIPTION OF THE INVENTION

Although the present invention is described in the following by reference to embodiment examples of a device for imaging a specimen surface, in particular with scattered Raman light, a so-called confocal Raman microscope, the invention is not limited to this. Rather, it comprises all confocal microscopes, in particular confocal light microscopes or fluorescence microscopes. A second light source with an electrically focusable lens can also be used for such confocal microscopes in order to bring the specimen into the confocal plane of Raman microscopy depending on the surface topography.

Figure 1A:
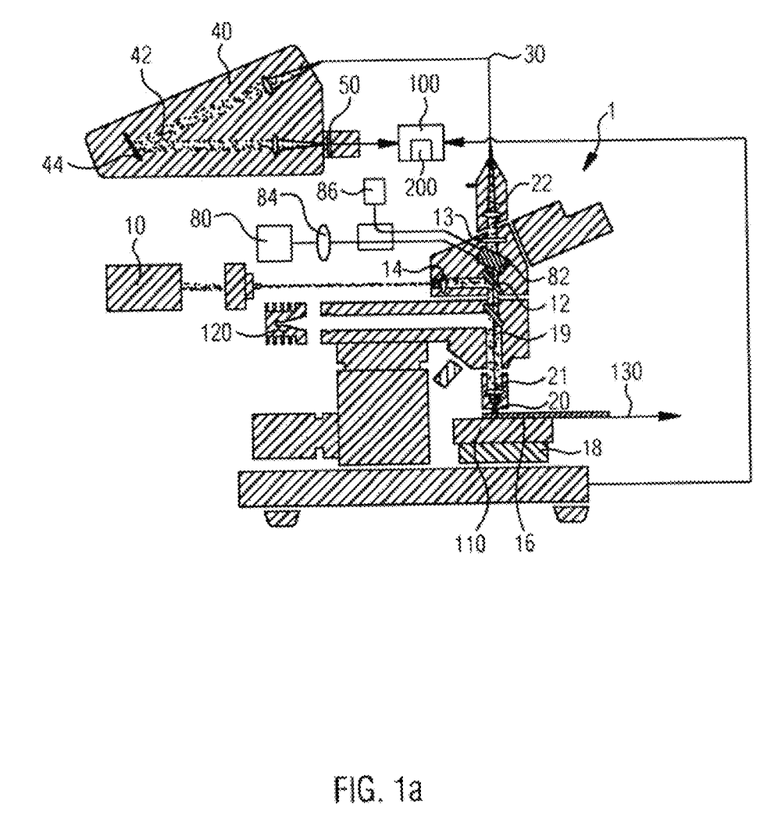
FIG. 1a shows the principal structure of a Raman microscope with a first and a second light source, wherein the beam path of the first and the second light source is drawn.

FIG. 1a shows the principal structure of a first embodiment of a confocal Raman microscope for recording a specimen surface. Confocal Raman microscopy can be used to analyze chemical properties and phases of liquid and solid components up to the diffraction-limited resolution range of about 200 nanometers. It is not necessary to mark the specimen with fluorescent substances such as those used in fluorescence microscopy. The confocal structure provides a depth resolution that allows the specimen to be analyzed in depth without having to make cuts, for example.

In confocal microscopy, a point-shaped light source, preferably a laser, is imaged on one point of the specimen. Subsequently, this pixel is focused preferably with the same optics onto a pinhole in front of a detector. The size of the pinhole aperture must be adapted to the diffraction-limited image of the lighting image. The image is now generated by scanning the measuring point over the specimen, i.e. scanning the specimen point by point. With this type of imaging, a considerable increase in image contrast is achieved, since only the focal plane of the lens contributes to the imaging. In addition, the resolution can be reduced by a factor of $\sqrt{2}$ to about $\lambda/3$ due to the folding of the diffraction point with the aperture of the pinhole. In addition, a three-dimensional image of the specimen structure can be obtained with an axial resolution of about one wavelength.

Concerning confocal microscopy, for example, reference is made to DE 199 02 234 A1.

FIG. 1a shows a possible structure of a confocal Raman microscope, for example the alpha300R microscope of WITec GmbH, D-89081 Ulm, Germany. With the confocal Raman microscope 1, the light of a first light source 10 is directed onto the specimen table 18 at a beam splitter mirror 12 after beam expansion 14 in the direction of the specimen 16. The light of the first light source, especially of the first laser, is preferably excitation light for Raman or fluorescence radiation and lies in a wavelength range from 350 nm to 1000 nm, preferably 500 nm to 1000 nm. The deflected light beam 19 of the excitation light is focused by a suitable optical system 21 onto an essentially point-shaped area 20 on the specimen 16. The light of the first light source, in particular the laser light source 10, interacts with the matter of the specimen 16. On the one hand, backscattered Rayleigh light of the same wavelength as the incident light is produced. This light is deflected via a beam splitter 12 to an edge filter or notch filter 13 and does not reach the detection optics.

The light with different frequency or frequencies than the Rayleigh light emitted by the specimen, namely the Raman light, passes through the beam splitter 12. Behind the beam splitter 12 the Raman light is marked with reference number 22. The Raman light 22 is injected into an optical fiber 30 via a pinhole (not shown) and reaches a spectrometer 40. In the spectrometer 40, the beam of Raman light is widened again by a suitable optical system, resulting in the beam 42, which hits a grating spectral filter 44. The grating spectral filter 44 diffracts the light according to its wavelength in different directions so that a spectral signal can be picked up on the CCD chip 50 depending on the location. For example, the CCD chip 50 has 1024 channels, so that a total of 1024 channels of the CCD chip can absorb light of different wavelengths.

The image of the specimen is created by scanning in the x/y plane in the direction of arrow 130.

Light from a white light source 120 can also be injected onto the specimen 16 for adjustment or observation.

The confocal Raman microscope 1 also comprises a second light source 80. The second light source 80 is in addition to the first light source of the confocal Raman microscope 1. The second light source, as shown in FIG. 1a, comprises an independent beam path of its own, which is coupled into the optics 21 of the lens via mirror 82. The beam path of the second light source strikes the specimen via the same optics 21 as the excitation light beam for Raman and/or fluorescence measurements of the first laser light source and is directed via mirrors 82 to a beam splitter which allows the light from the second light source to pass in the direction of the mirror 82 and the optics 21 and decouples the light reflected back from the surface by the optics 21 so that the light reflected back from the specimen surface is directed to a photodiode 86. There, the reflected signal is detected and fed to an evaluation unit (not shown). The evaluation unit determines from the reflected signal the phase position of the maximum of the photodiode signal relative to the excitation signal of the electrically focusable lens 84. This phase position is a measure for the height change of the surface of the specimen. Depending on the phase position, the specimen table is then moved in such a way that the specimen is located continuously in the focal plane for Raman and/or fluorescence microscopy. The procedure of the specimen table is controlled or regulated depending on the phase position.

In addition, after the second light source 80, an electrically focusable lens 84 is inserted into the beam path, which serves to change the focal position of the second light source 80. The electrically focusable lens can, for example, be the electrically adjustable, i.e. focusable lens EL-16-40-TC from Optotune Switzerland AG, Bernstrasse 388, CH-8953 Dietikon, which allows detuning in the range −2 to +3 diopters at 30° C. The lens can also be used for the adjustment of the lens to the desired position. The aperture of the electrically focusable lens EL-16-40-TC is 16 mm, the transmission in the wavelength range is 450 nm to 950 nm and is over 90%. The described electric lens is exemplary and not restrictive. The disclosure content of the technical data sheet of Optotune Switzerland AG on the electrically tunable lens is included in the disclosure content of this application. The electrically focusable lens is preferably excited periodically, especially with a frequency in the range 200 to 500 Hz. Other frequencies are also possible. The focal position of the second light source is periodically changed by the periodic excitation of the electrically focusable lens. Whenever the focal plane comes to rest in/on the specimen, a signal is detected at the photodiode 86. From this signal, the phase position of the photodiode signal relative to the excitation signal of the electrically focusable lens can be determined and thus deduced from the specimen topography. Depending on the phase position, the specimen table is then moved in such a way that the surface topography of the specimen is balanced and the specimen is always in the confocal plane for Raman and/or fluorescence microscopy. This is described in detail in FIGS. 2a-2b.

Figure 1B:
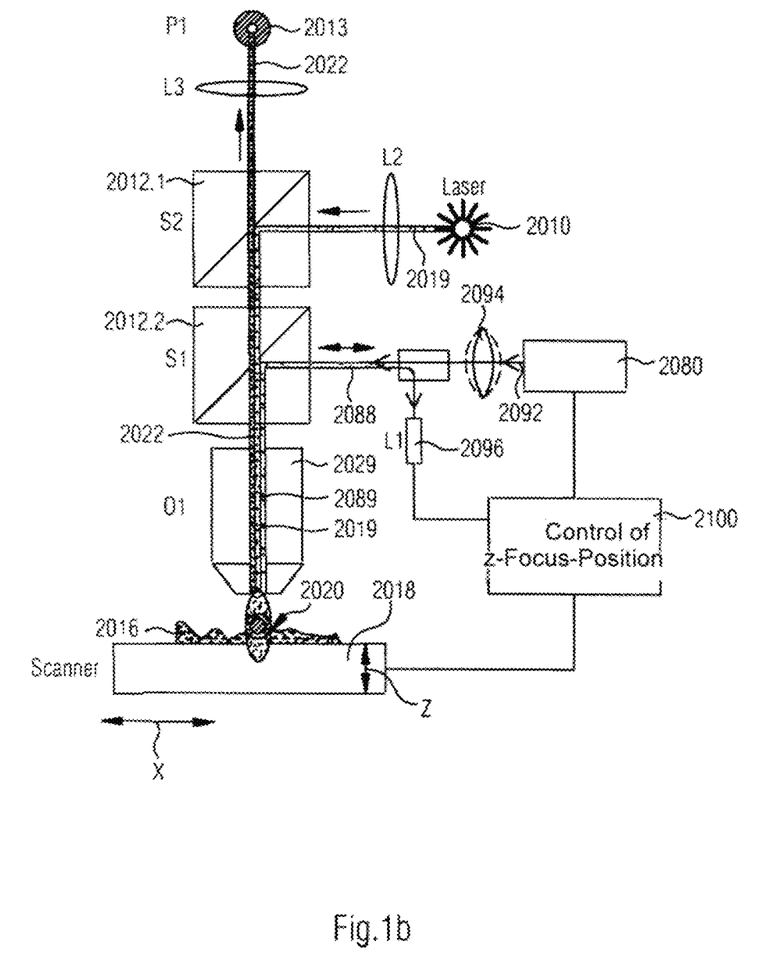
FIG. 1b shows the principal structure of a Raman microscope with first and second light sources, wherein the excitation focus of the first light source for the Raman measurement is guided through the same objective as the focus of the second light source.

FIG. 1b shows the principal structure of a confocal Raman microscope with a z-scanner, wherein the light from the first light source 2010 or the laser for Raman measurement is guided parallel to the light from the second light source 2080 for topography measurement. The same components as in the previous FIG. 1a are marked with reference numbers increased by 2000. In the Raman microscope 2001 shown in FIG. 1b, both the light from the first light source 2010, to excite the Raman effect, and the light from the second light source 2080 are focused by the same optics in 2029 on essentially the same lateral area 2020 of the specimen 2016. The focal position for the Raman measurement, i.e. the confocal focus of the excitation laser light of the first light source 2010, is selected for the excitation of the Raman effect. The light from the first light source 2010 is injected into the specimen 2016 by means of a beam splitter 2012.1. The light beam 2019 is redirected in the beam splitter 2012.1 in the direction of the specimen 2016 and passes through the further beam splitter 2012.2. The Raman light generated by the interaction of the specimen passes through both the beam splitter 2012.1 and the beam splitter 2012.2 and is designated with reference number 2022 behind beam splitter 2012.2. Behind beam splitter 2012.2, the light beam 2022 is focused on a pinhole 2013 in front of a detector (not shown). The light path of the second light source is marked with reference number 2092. In the light path from the second light source 2080 to the specimen 2016 an electrically focusable lens 2094 is arranged.

In addition to the light from the light source 2010, which is used to excite the Raman effect in the specimen, the further beam splitter 2012.2 directs the light 2092 from the second light source 2080 through the same optics 2029 as the light to excite the Raman effect onto the specimen 2016. The light beam is marked with reference number 2019. The light of the second light source 2080, irradiated onto the specimen, is reflected by the specimen. The reflected light 2089 is again directed via the further beam splitter 2012.2 onto a beam splitter and from there onto a diode 2096. The signal recorded by the diode 2096 is fed to an evaluation unit 2100. The evaluation unit 2100 is at the same time the regulation of the scanner, which is shifted according to the signal of the photodiode, in z-direction.

The diode 2096 that picks up the light signal is an InGaAs diode, for example.

In order for both the light for the excitation of the Raman effect and the second light source light to pass through the same optics, it is advantageous to use either different spectral ranges or a time division multiplex device. For example, the light of the second light source can be in the wavelength range from 1000 nm to 2000 nm and the light wavelength for excitation of the Raman effect can be 532 nm, i.e. in the range from 350 nm to 1000 nm. Such a constellation would then allow the recording of Raman spectra usually above 532 nm. Of course, the selection of other wavelengths would also be conceivable.

The structure shown in FIG. 1b enables the specimen surface to be moved into the confocal plane for Raman measurement in a regulated manner with the aid of the second light source 2080 and the focusable lens 2094, in particular the electrically focusable lens. The regulation and/or control of the scanner can be done by a regulator and/or a controller.

In addition to the regulation/control for the Raman measurements, a pure topography measurement alone is also possible. Non-contact topography measurement is particularly suitable for specimens which are sensitive or whose topography is already too high for AFM (>5 µm) or whose lateral structures are much larger than the typical scan ranges of piezo scanners, e.g. 100 µm.

Figure 1C:
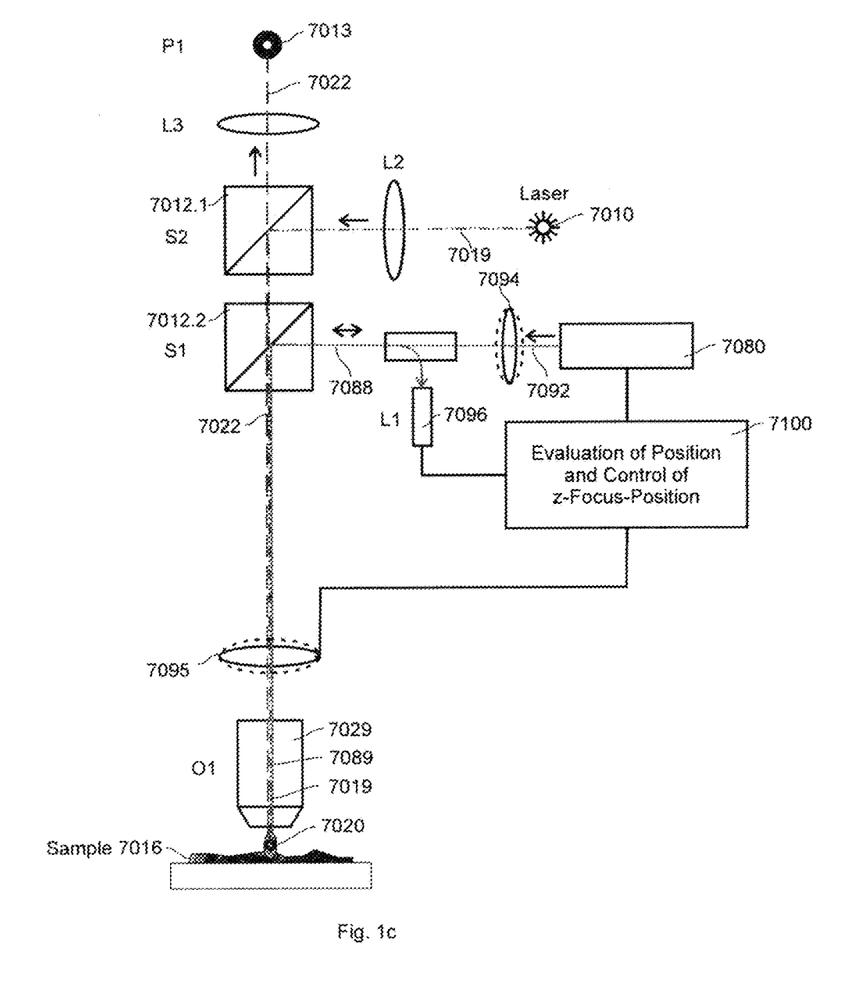
FIG. 1c shows the principle structure of a Raman microscope as in FIG. 1b with a focusable lens between the light sources and the microscope objective.

FIG. 1c shows a Raman microscope which uses instead of a movement of the table with the specimen or probe in the confocal plane in a regulated manner via a z-scanner a further focusable, especially electrically focusable lens which is situated between the beam splitter 7012.2 and the objective 7029. Instead of moving the table in this embodiment the focus of the further or so called second focusable lens 7095 is changed to bring the confocal plane to the surface of the specimen. The evaluation unit 7100 regulates the focus of the electrically focusable further lens 7095. Since beside the focusable lens all other components of the microscope are identical to those of FIG. 1*b* the reference numbers are raised by 5000, which means e.g. reference number 7080 denotes the second light source in FIG. 1*c*, which is denoted 2080 in FIG. 1*b*.

Figure 1D:
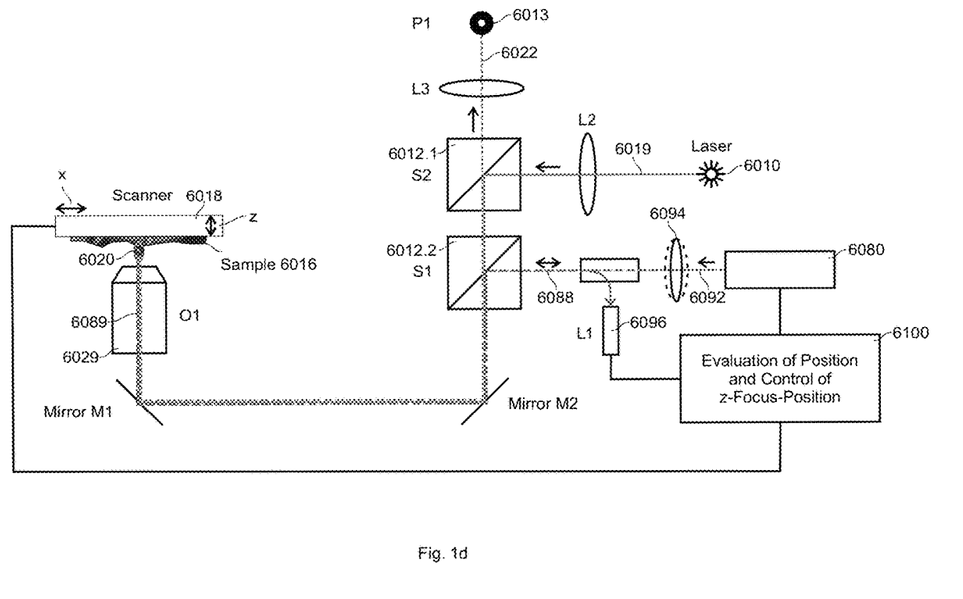
FIG. 1d shows an inverted microscope.

Instead of placing the sample under the objective of an upright microscope, one can also use an inverted microscope, where the sample is placed on an table above all the optics, laser sources and detectors. A possible setup is shown in FIG. 1*d*. The same components as in FIG. 1*b* are denoted by reference numbers raised by 4000, which means reference number 6080 denotes the second light source, which is denoted 2080 in FIG. 1*b*. In order to bring the light to the sample 6016 situated on a table above all the optics as shown in FIG. 1*d*, it is necessary to deflect the light beam by two additional mirrors M1 and M2 situated in the light path after the beam splitter 6012.2 and before the objective 6029. This setup has advantages with samples, which have only one flat surface to be investigated with the microscope e.g. a grinded rock sample or if your sample is located in a fluid within a petri dish and the access from above is not possible or unwanted. Another advantage of an inverted microscope especially for transparent samples is that this setup allows access to the sample from above while observing/imaging simultaneously from below, e.g. using patch clamp techniques on biologic cells while simultaneously observing the cells with the inverted microscope from below.

Figure 2A:
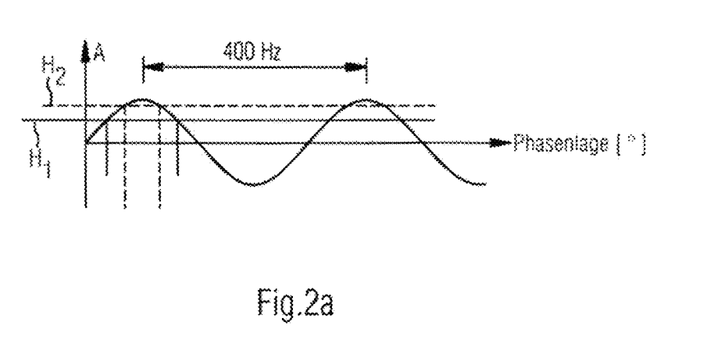
FIGS. 2a-2b show modulation of the electrically focusable lens and detected signals for the second light source.
Figure 2B:
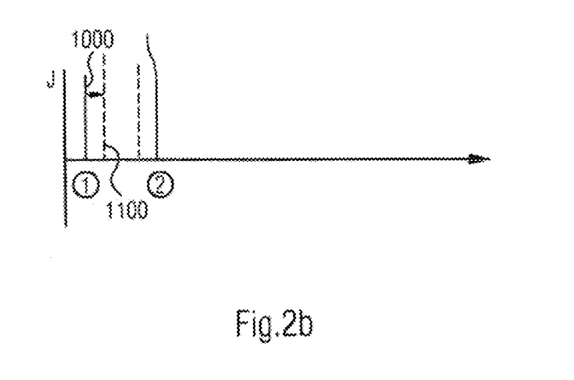

FIG. 2*a* shows the sinusoidal modulation of the focus of the lens of the second light source. The selected modulation frequency in this example is 400 Hz. Due to the sinusoidal modulation of the focus of the lens, the focal position of the second light source is also passed through sinusoidally as shown in FIG. 2*a*. In FIG. 2*a*, two heights of the surface to be investigated are drawn into the sinusoidally modulated course. The first height is marked H1, the second height H2. If the sinusoidal focus of the second light source lies on the surface of the specimen with the height H1, the confocal condition is fulfilled and the signal 1000 shown in FIG. 2*b* is detected at the diode. The phase position of the signal 1000 is about 15°. If the height of the specimen increases, for example due to thermal expansion, the height shifts from H1 to H2. Now the signal 1100 is detected instead of the signal 1000. As shown in FIG. 2*b*, signal 1100 is shifted to the right relative to signal 1000, the phase position of signal 1100 is 30°, and the difference in the phase position between the first and second signals is 15°. The signal 1100 is again detected when the focus of the second light source comes to lie on the surface with the height H2. The phase shift of the signal of the second light source detected at the diode is thus a measure of how the height of the specimen changes and can be used as a regulating or control variable for controlling or regulating the specimen to compensate for a height difference of the specimen and to transfer the specimen to the focal plane of the first light source for Raman and/or fluorescence microscopy. As FIG. 2*b* shows, the signals at the photodiode move to the right (signal group 1) as well as to the left (signal group 2) at a height change H1 to H2 from 1000 to 1100. However, only the displacement in one direction is used for regulating, in this case the displacement to the right according to signal group 1.

Figure 2C:
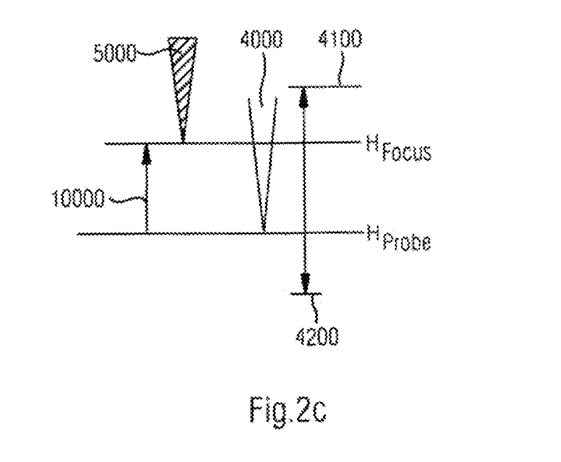
FIG. 2c shows the principal representation of the focuses of the first and second light sources and an uneven specimen surface.

FIG. 2*c* shows a specimen with a height Hspecimen, wherein the height Hspecimen is below the height of the focus HFocus for Raman microscopy. The focus of the second light source is designated with reference number 4000, it is modulated sinusoidally in the capture range between 4100 and 4200, for example. This allows the height of the specimen Hspecimen to be determined from the focal position of the second light source. If the height has decreased as in the example shown, for example due to a deepening of the HFocus after Hspecimen, the focus 5000 of the Raman measurement would lie outside the specimen. Due to the sinusoidal modulation between the limits 4100 and 4200 of the focal position of the second light source, the height Hspecimen is detected and, due to the phase position, the specimen is returned to the focus 5000 of the Raman measurement by means of a control or regulation. Moving the specimen from Hspecimen to HFocus is marked with reference number 10000.

Figure 3:
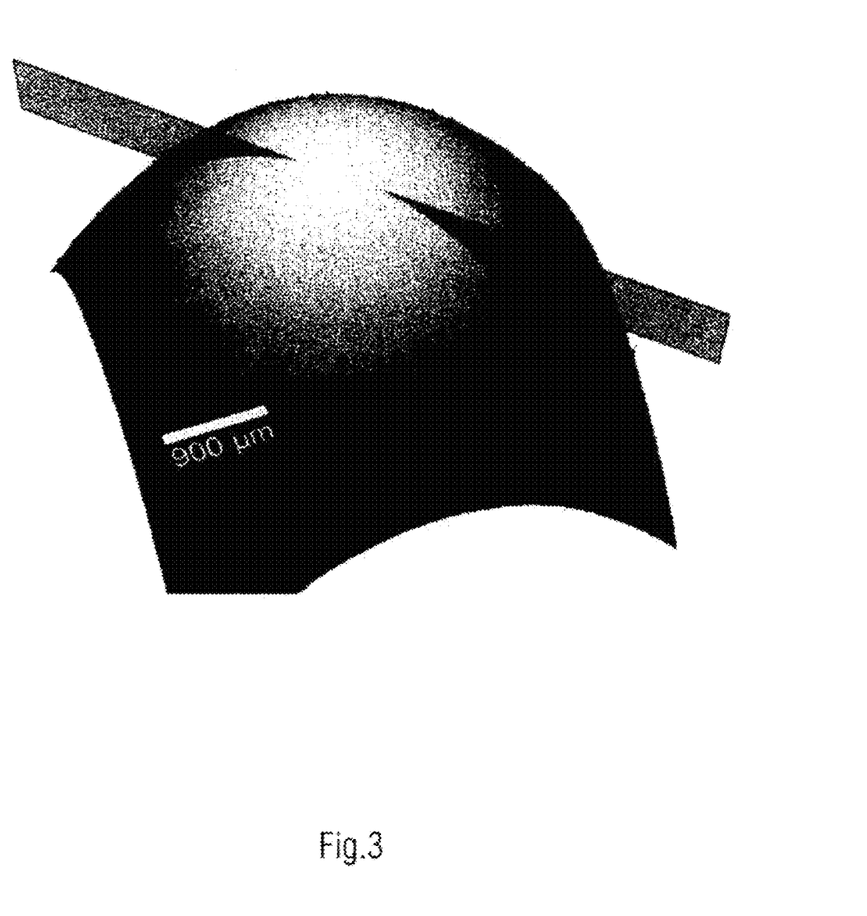
FIG. 3 shows the topography of a specimen to be examined.

FIG. 3 shows a topography of a specimen. The specimen has an expansion in x-direction of 5000 μm. In the z-direction, the specimen is curved with a depth of ±30 μm.

Figure 4:
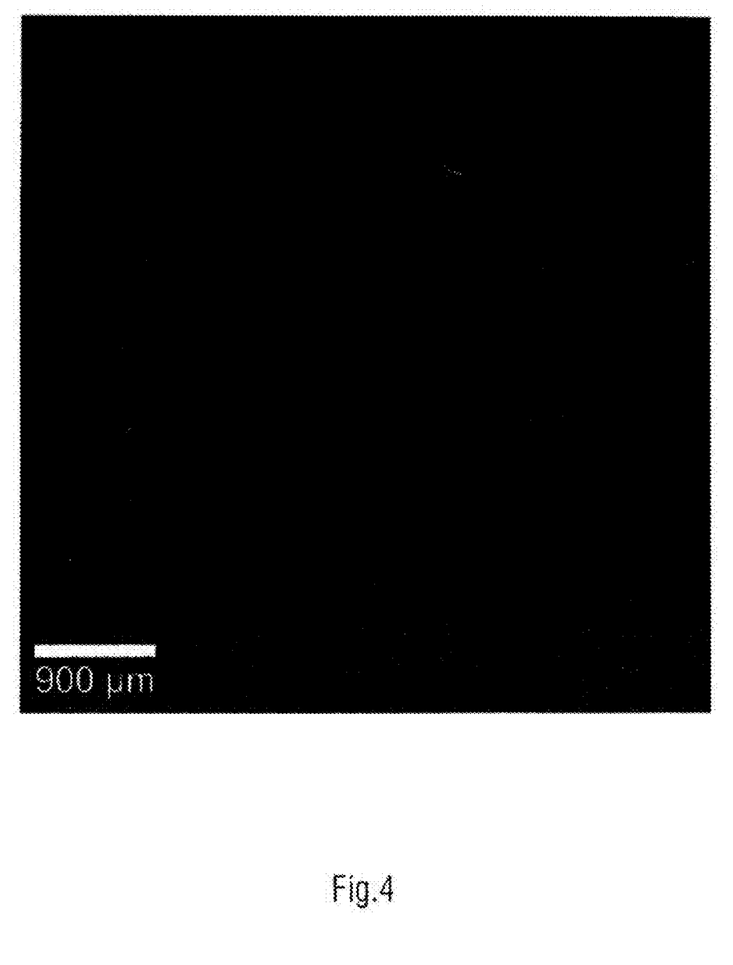
FIG. 4 shows the imaging of the specimen according to FIG. 3 without regulation, which brings the specimen into the confocal plane of Raman and/or fluorescence microscopy.

FIG. 4 shows the imaging of a specimen having a height profile as shown in FIG. 3, with confocal Raman microscopy, wherein the specimen was not moved and no regulation of the specimen into the confocal plane took place. It can be clearly seen that only a narrow edge area of the specimen is in the focus of the Raman measurements so that only this area is sharply imaged. The sharp area that is imaged is the bright area, the blurred area is dark.

Figure 5:
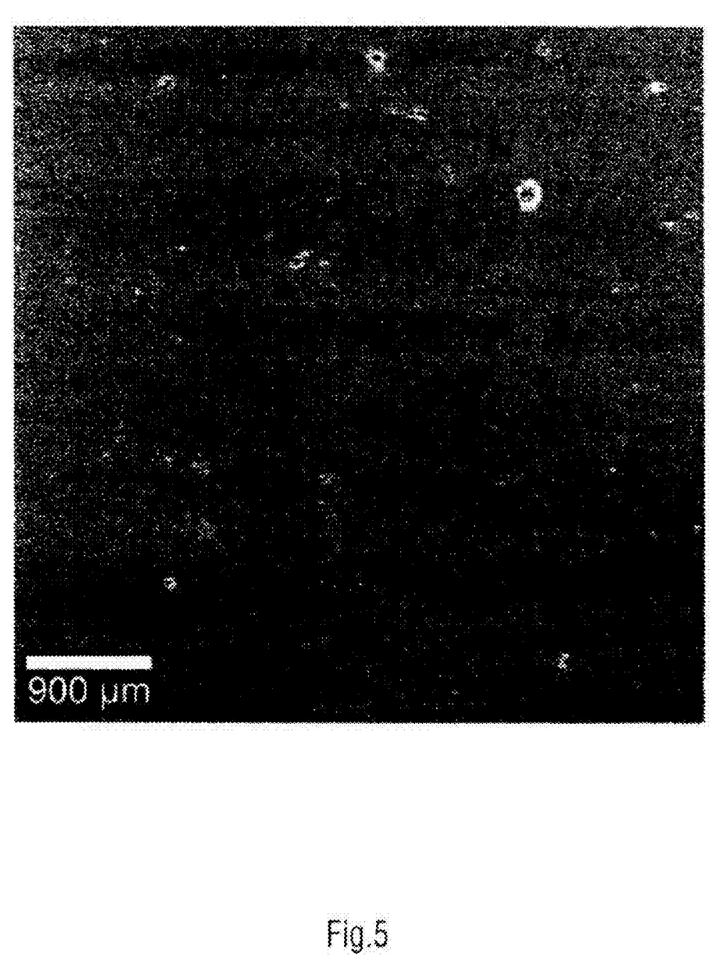
FIG. 5 shows the imaging of the specimen according to FIG. 3 with regulation, which brings the specimen into the confocal plane of Raman and/or fluorescence microscopy.

FIG. 5 shows the Raman measurement on a surface as shown in FIG. 3, where, in contrast to FIG. 4, the specimen was brought into the confocal plane in a controlled manner by means of the focus of the second light source. The result is a completely sharp, bright image.

Figure 6:
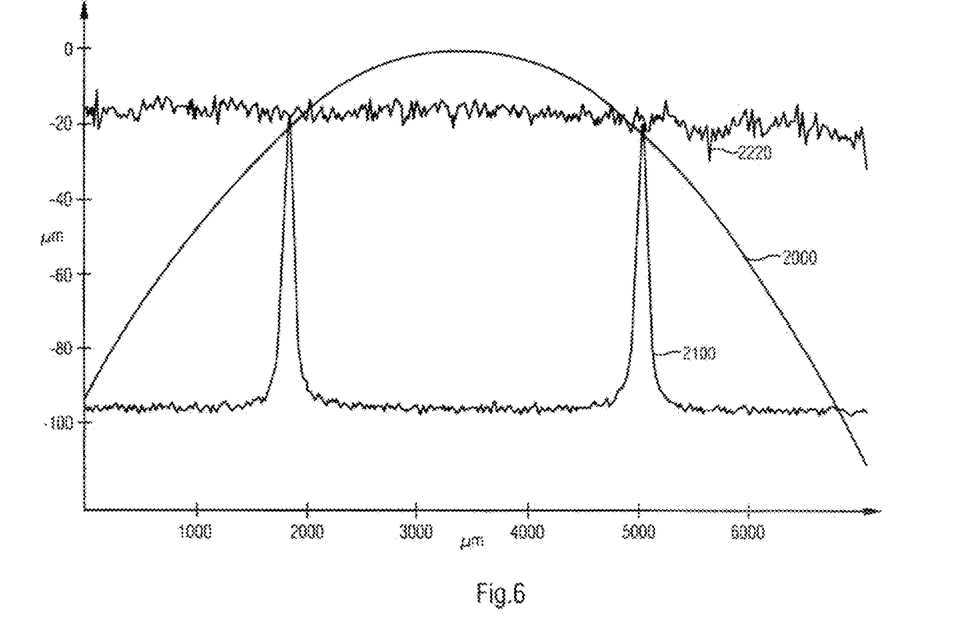
FIG. 6 shows the intensity profile of the Raman signal with and without regulation and surface topography of the specimen.

FIG. 6 shows the effect of the regulation according to the invention. FIG. 6 shows the course of the surface of the specimen with reference number 2000. The surface of the specimen has a depth or z deviation of 100 μm over an x expansion of 7000 μm. Curve 2100 represents the Raman intensity without regulation. As can be seen from curves 2100, Raman signals only occur when the specimen is in the confocal plane for Raman measurements. This is exactly the case for two surface values. The higher or lower areas of the surface are outside the focal plane and show no signal. With the help of the second light source, however, it is possible to always hold the surface in the confocal plane of the Raman and/or fluorescence measurement with the help of the evaluation of the focal position of the second light source by means of the regulation according to the invention, so that a Raman signal 2200 is detected over the entire specimen.

As the figure shows, the Raman signal 2200 with regulation is as strong in intensity as the two peaks 2100, which are detected when the specimen is moved into focus without regulation. This means that a signal corresponding to the signal of the specimen in focus is obtained over the entire specimen despite the surface course of 2000 during regulation.

The invention is the first to provide a device that allows information on the surface of a specimen to be obtained quickly and easily using confocal microscopy. In particular, this is achieved with the help of a second excitation and detection path, which makes it possible to keep the confocal main measurement permanently in focus even with the most difficult specimens. The surface topography is preferably determined by modulating a focusable lens, which only influences the second excitation and detection path.

The invention claimed is:
1. Method for imaging a surface of a sample with a topography by means of confocal Raman and/or fluores- cence microscopy, in which a first light source is provided for generating excitation radiation for Raman scattered light and/or fluorescence and a second light source, characterized in that the first light source emits light in a first wavelength range, wherein the limits of the first wavelength range are defined by the limits of the emitted luminescence spectrum and/or Raman spectrum of the sample to be examined, the light from the first light source is directed onto the sample by means of optics, the second light source emits light in a second wavelength range; wherein the second wavelength range lies above or below the first wavelength range without overlaps with the first wavelength range; and the light of the second light source with the optics and a periodically excited first lens is brought onto the surface of the sample, resulting in a periodic focus, such that the topography of the sample is determined from the signal of the focal plane of the second light source and the detected light of the second light source with the aid of a control/regulating device, such that the control/regulating device changes the focus of a second lens in a light path between the first and second light sources and a microscope objective and the focus of the first light source is tracked by means of the optics on the basis of this signal and is applied to the sample, and the modulation range of the periodic focus of the second light source is tracked by means of the optics on the basis of the signal.

2. Method according to at least one of claim 1, characterized in that light from the first and second light sources is guided through the same optics, especially the microscope objective.

3. Method according to claim 2, wherein the transfer into the focal plane of the first light source is effected by changing the focal length of a further electrically focusable lens situated in the light path of the light between the beam splitter and the microscope objective.

4. Method according to at least one of claim 3, characterized in that the focal plane of the second light source is varied periodically and the topography of the sample is determined from the temporal course of the maxima of the intensity of the reflected and/or scattered light of the second light source on the surface of the sample.

5. Method according to one of claim 4, characterized in that the periodically excited lens is a electrically focusable lens in which the focal length is controlled by applying an electric voltage or by an electric current situated in a light path from the second light source to the microscope objective.

6. Method according to one of claim 5, characterized in that the first device, in particular first light source for generating excitation radiation for Raman scattered light and/or fluorescent light, emits radiation, in particular light, simultaneously with the second device, in particular with the second light source.

7. Method according to one of claim 6, characterized in that a measurement of the Raman scattered light and/or the fluorescence excited by the first light source and the measurement of the topography of the sample with the aid of the second light source takes place substantially simultaneously.

8. Method according to one of claim 7, characterized in that the first light source comprises a first focus having a first focus size and the second light source comprises a second focus having a second focus size, and the first and second focus sizes are substantially equal.

9. Device (1) for imaging the surfaces of a sample with a topography by means of confocal Raman and/or fluorescence microscopy, comprising a first light source for Raman scattered light and/or fluorescence, and a second light source, wherein the first light source emits light in a first wavelength range, wherein the limits of the first wavelength range are defined by the limits of the emitted luminescence spectrum and/or Raman spectrum of the sample to be examined, the second light source emits light in a second wavelength range; wherein the second wavelength range lies above or below the first wavelength range without overlaps with the first wavelength range;

the light from the first light source and the second light source is guided through a microscope objective the device comprises a first focusable lens for bringing the focal plane of the second light source into/onto the surface of the sample; and the device comprises a second focusable lens in a light path between the first and second light source and the microscope objective; and a control/regulating device which determines the topography of the sample from a signal of the focal plane of the second light source and changes the focus of the second focusable lens in the light path between the light sources and the microscope objective and focus the focal plane of the first and second light source on basis of this signal and the detected light of the second light source onto the sample.

10. Device according to claim 9, characterized in that the device is one of the following devices:
a confocal Raman microscope;
a confocal fluorescence microscope;
a confocal Raman/fluorescence microscope.

11. Device according to claim 10, characterized in that the device is a confocal Raman microscope and/or fluorescence microscope and a light emission is excited in the sample with the aid of the first light source and the device comprises a detector for detecting the photons emitted by the sample, in particular the emitted Raman and/or fluorescence photons.

12. Device according to at least one of claim 11, characterized in that the confocal Raman and/or fluorescence microscope comprises an optical element, in particular an objective (2029), with which the light of the first and/or second light source is focused onto the sample.

13. Device according to claim 10, characterized in that the second focusable lens and the first focusable lens is an electrically focusable lens or a mechanically displaceable lens.

14. Device according to one of claim 10, characterized in that the first wavelength range comprises wavelengths of 350 nm to 1000 nm, in particular 500 nm to 1000 nm, and the second wavelength range comprises wavelengths of 1000 nm to 2000 nm, in particular 1000 nm to 1500 nm.

15. Device according to one of claim 10, characterized in that the device comprises a lifting table and/or a table with piezo elements.

16. Device according to claim 15, wherein the control/regulation device additionally moves the sample to a predetermined position in z-direction.

17. Device according to claim 9, Wherein the device comprises in a light path from a beam splitter to the microscope objective at least one mirror.

18. Use of a method according to claim 1 for high-resolution measurement, in particular of Raman and/or fluorescence signals on porous and/or rough samples.

19. Use of a method according to one of claim 1 for the measurement, in particular of Raman and/or fluorescence signals on samples with thermal and/or mechanical drift.

20. Use of a method according to one of claim 1 for measuring, in particular, Raman and/or fluorescence signals on drying samples or liquids which evaporate.

21. Use of a method according to one of claim 1 for the simultaneous measurement of Raman and/or fluorescence signals and surface topography on a sample.

* * * * *